No. 796,306.  
PATENTED AUG. 1, 1905.  
I. W. EXLEY.  
HOSE COUPLING.  
APPLICATION FILED FEB. 17, 1905.
2 SHEETS—SHEET 1.
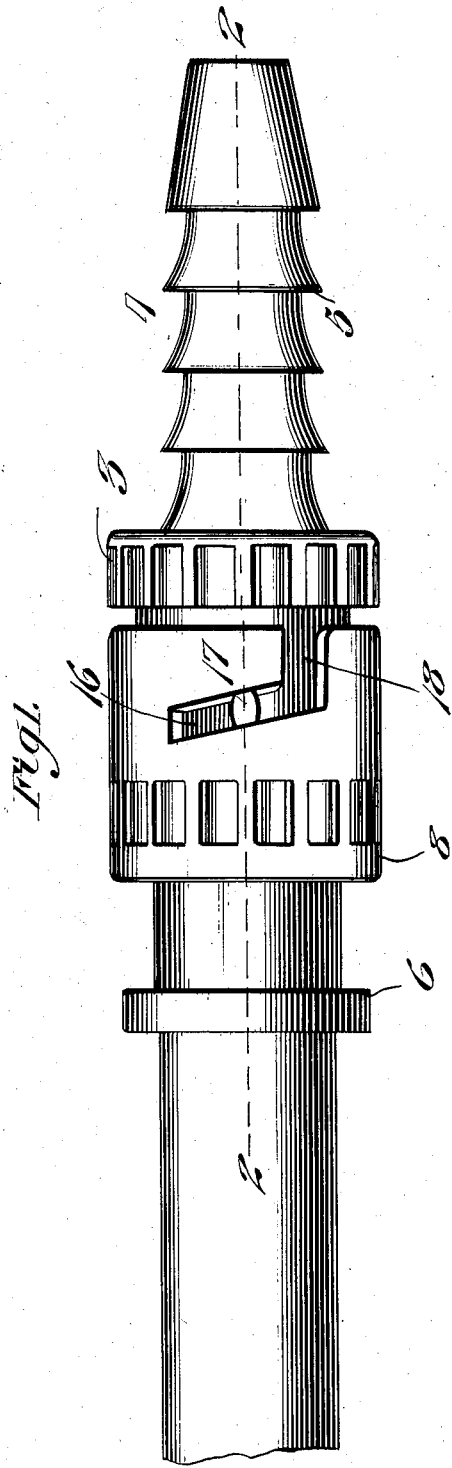
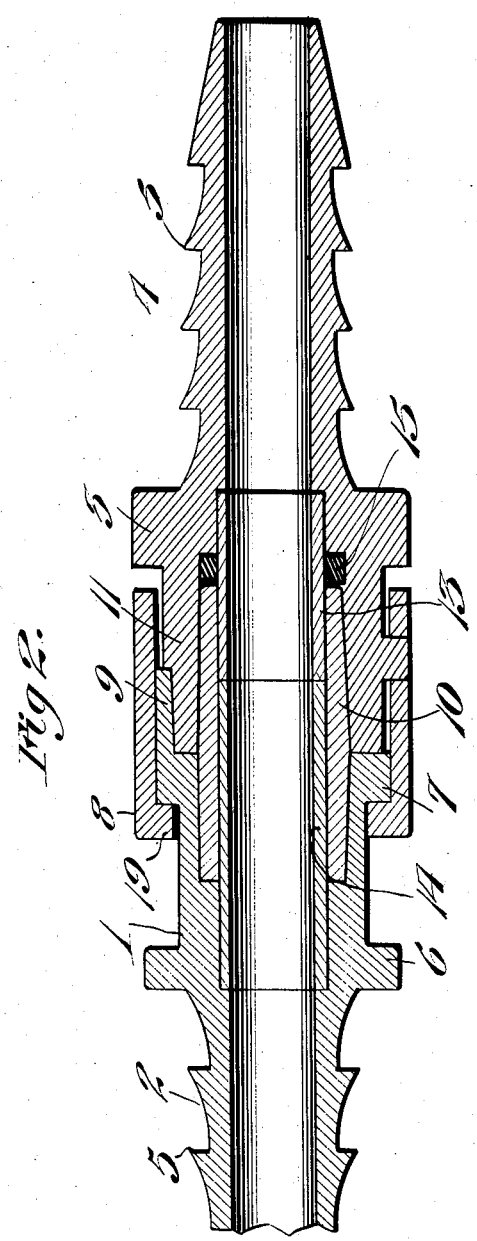
Inventor  
Isreal W. Exley No. 796,306. PATENTED AUG. 1, 1905.
I. W. EXLEY.
HOSE COUPLING.
APPLICATION FILED FEB. 17, 1905.
2 SHEETS—SHEET 2.
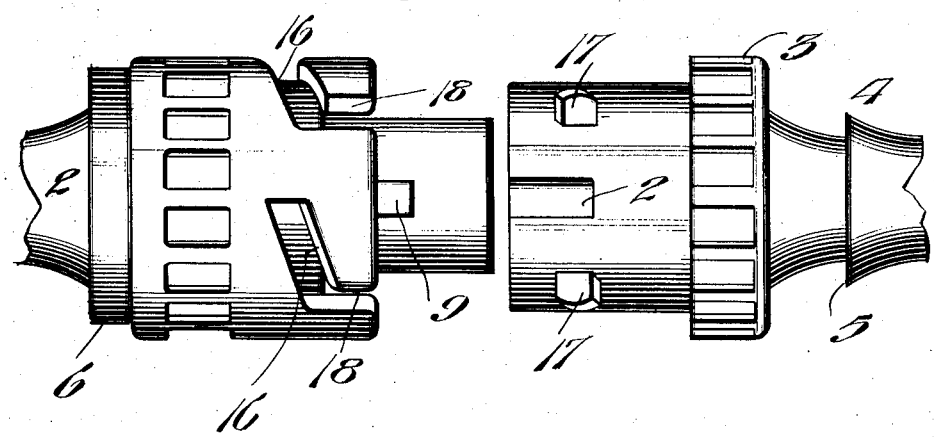
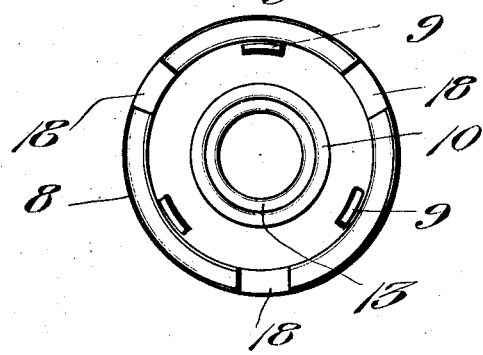
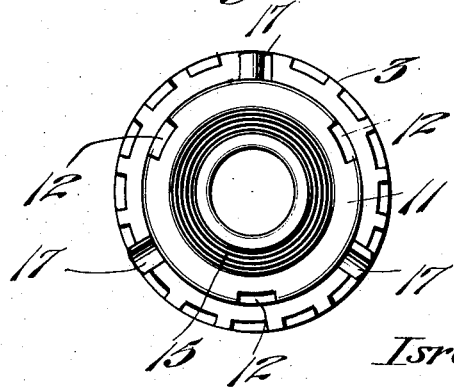
Inventor
Isreal W. Exley
Witnesses
Phil. E. Barnus
G. S. Elmore
By Victor J. Evans
Attorney

UNITED STATES PATENT OFFICE.

ISREAL W. EXLEY, OF COLVILLE, WASHINGTON.

HOSE-COUPLING.

No. 796,306.  Specification of Letters Patent.  Patented Aug. 1, 1905.

Application filed February 17, 1905. Serial No. 246,129.

*To all whom it may concern:*

Be it known that I, ISREAL W. EXLEY, a citizen of the United States, residing at Colville, in the county of Stevens and State of Washington, have invented new and useful Improvements in Hose-Couplers, of which the following is a specification.

This invention relates to hose-couplers, and has for its objects to produce a simple inexpensive device of this character in which the coupling members may be brought into ready and accurate engagement and securely locked in coupled position, one wherein the uncoupling operation may be quickly performed, and one wherein leakage of liquid passing through the coupler will be wholly obviated.

With these and other objects in view the invention comprises the novel features of construction and combination of parts more fully hereinafter described.

In the accompanying drawings, Figure 1 is an elevation of a coupler embodying the invention and showing a hose-section attached to one of the coupling members. Fig. 2 is a longitudinal section taken on the line 2 2 of Fig. 1, the hose being omitted. Fig. 3 is a detail view in elevation, showing the members uncoupled. Fig. 4 is an end view of the primary coupling member. Fig. 5 is an end view of the secondary member.

Referring to the drawings, 1 designates the primary or female coupling member, provided with a shank 2, and 3 the secondary or male member, having a shank 4, the shanks 2 and 4 being formed with peripheral ribs or projections 5, arranged in appropriately-spaced relation and adapted for holding the hose-sections in secure engagement with the shanks.

The primary member 1, which has a pair of peripheral spaced shoulders or flanges 6 7 for maintaining in place a coupling member or sleeve 8, is provided with a plurality, preferably three, of forwardly-projecting engaging members or fingers 9, spaced laterally from and surrounding a central tubular core 10, while the secondary or male member 3 has formed at appropriately-spaced intervals and adjacent the forward end of its body 11 a plurality of longitudinal seats or recesses 12, designed, respectively, to register with and receive the fingers 9 when the members are brought into coupling position, there being formed within the body of the member 3 a tubular core 13, adapted to enter the adjacent end of the core 10. The member 1 also has arranged therein and within the core 10 a supplemental tubular core 14, against the outer end of which the adjacent end of the core 13 abuts, while within the member 3 and surrounding the core 13 is a packing-ring or gasket 15, of rubber or analogous material, against which the end of the main core 10 abuts for a purpose which will hereinafter appear.

The coupling member or ring 8 is provided with a plurality, preferably three, of bayonet-slots 16, designed to receive correspondingly-spaced lugs or projections 17, formed on the body 11 of the male member 3, the slots 16 being provided with forwardly-opening portions 18, whereby the lugs may enter freely into the respective slots.

In practice when the members 1 and 3 are brought into coupling position the fingers 9 will enter the recesses 12 to thus maintain the members in proper alinement and against relative rotation, the sleeve 8 being thereafter rotated until the portions 18 of the bayonet-slots come into register with the lugs 17, whereupon the sleeve is moved forwardly and then rotated to effect the proper coupling engagement of the parts, it being apparent in this connection that the inwardly-projecting flange 19 on the end of the sleeve 8 will bear against the flange 7 on the member 1, thereby permitting the sleeve during rotation and through the action of the inclined portions of the slots 16 upon the lugs 17 to draw the members into secure coupled engagement. As the members of the coupler are drawn together the end of the sleeve 10, through contact with the gasket 15, compresses the latter, whereby the gasket exerts a spring action for binding the lugs 17 securely within the slots 16, thus preventing accidental rotation of the sleeve and consequent uncoupling of the parts.

From the foregoing it is apparent that I produce a simple efficient device which in practice will admirably perform its functions to the attainment of the ends in view, it being understood that minor changes in the details herein set forth may be resorted to without departing from the spirit of the invention.

Having thus fully described the invention, what is claimed as new is—

In a device of the class described, a coupling member provided with forwardly-projecting fingers, a companion coupler having longitudinal recesses to receive said fingers, a coupling-sleeve carried by one of the members and provided with bayonet-slots, lugs on the other member for engagement with said slots, a tubular core provided on and projecting forwardly from one of the members, and an elastic packing-gasket in the other member for contact with the end of said core.

In testimony whereof I affix my signature in presence of two witnesses.

ISREAL W. EXLEY.

Witnesses:
C. A. MANTZ,
F. W. REHFELD.